United States Patent [19]

Henninger et al.

[11] 3,967,900

[45] July 6, 1976

[54] SIGNAL GATING DEVICE

[75] Inventors: Heinz Willi Henninger; Lothar Riethmüller, both of Uhldingen-Muhlhofen, both of Uhldingen-Muhlhoffen; Hans Walter Kiefer, Nussdorf; Ernst Günther Robert Spreitzhofer, Uberlingen, all of Germany

[73] Assignee: Bodenseewerk Perkin-Elmer & Co. GmbH, Uberlingen, Germany

[22] Filed: Feb. 12, 1975

[21] Appl. No.: 549,157

[30] Foreign Application Priority Data

Feb. 16, 1974 Germany............................ 2407607

[52] U.S. Cl................................... 356/88; 356/93
[51] Int. Cl.² ........................................ G01J 3/42
[58] Field of Search ............... 356/81, 82, 83, 87, 356/88–98; 328/63; 250/339

[56] References Cited
UNITED STATES PATENTS

| | | |
|---|---|---|
| 2,955,508 | 10/1960 | Martin .................................. 356/93 |
| 3,787,121 | 1/1974 | Lowy et al. ............................ 356/93 |
| 3,828,173 | 8/1974 | Knepler ................................. 356/81 |
| 3,895,874 | 7/1975 | Ogiwara ................................ 356/93 |

Primary Examiner—John K. Corbin
Assistant Examiner—R. Hille
Attorney, Agent, or Firm—S. A. Giarratana; F. L. Masselle; J. M. O'Meara

[57] ABSTRACT

Operation between a beam switch which directs light to a photoelectric detector and a gating means for directing signals from the photoelectric detector to separate storage channels is synchronized by generating a marker pulse within a sequence of clock pulses which correspond to the positions of the beam switch. Signals from the separate storage channels are directed to an analyzing means in a predetermined sequence by the gating means and sequencing within the analyzing means is also accomplished thereby. Furthermore, comparative analysis between signals corresponding with two positions of the beam switch is provided at the input to and/or the output from the separate storage channels.

12 Claims, 3 Drawing Figures

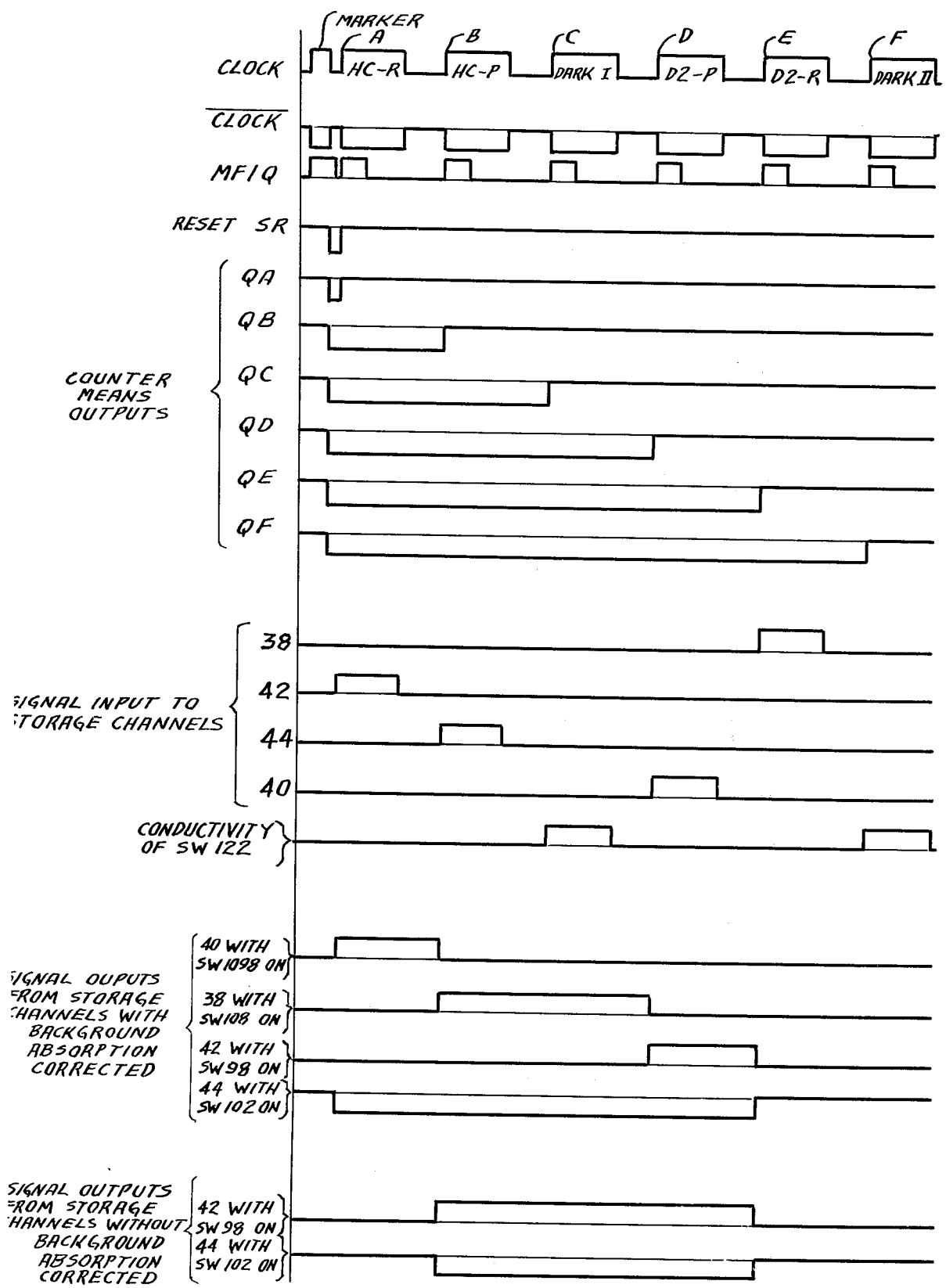

SIGNAL GATING DEVICE

BACKGROUND OF THE INVENTION

The present invention relates to apparatus by which gating means for directing signals from a photoelectric detector to separate storage channels is synchronized with the positions of a beam switch which sequentially directs light from different beams to the photoelectric detector. Beam switches are commonly used in analytical equipment, such as atomic absorption spectrophotometers where the readout is mathematically related to the output signal of the photoelectric detector at each position of the beam switch. Therefore, circuit means must be provided for processing the detector output signals to the desired mathematical result. Of course, noise is always a problem where signals are processed directly from the photoelectric detector, due to the step nature of such signals. Although gating circuits may have been known for controlling storage channels which would have resolved this problem, to synchronize such circuits with the sequential positions of the beam switch was unknown in the art.

SUMMARY OF THE INVENTION

It is the general object of this invention to provide synchronous operation between a gating means for directing output signals from a photoelectric detector to separate storage channels and a beam switch which sequentially directs light from different beams to the photoelectric detector.

It is a further object of this invention to utilize the gating means thereof in directing signals sequentially from the separate storage channels to an analyzing means and/or in performing sequencing within the analyzing means.

It is still a further object of this invention to utilize the gating means thereof in providing comparative analysis between signals corresponding with two positions of the beam switch.

These objects are accomplished according to the present invention with a photoelectric means for generating a marker pulse within a sequence of clock pulses which correspond to the positions of the beam switch, by directing the clock pulses to the input of a counter means for generating output signals in sequence with input pulses thereto and by resetting the counter means through a logic gate with the marker pulse. The sequence of output signals from the counter means controls the gating means for directing signals from the photoelectric detector to each storage channel. The gating means controls both input and output switches in each channel with the latter being utilized to direct signals from the storage channels to the analyzing means. Sequencing within the analyzing means and comparative analysis between signals is also achieved through switches which are controlled by the gating means.

BRIEF DESCRIPTION OF THE DRAWINGS

The manner is which these and other objects of the present invention are achieved will be best understood by reference to the following description, the appended claims, and the attached drawings, wherein:

FIG. 2 is the pulse-timing diagram for the apparatus of FIG. 1 a and b.

DESCRIPTION OF THE PREFERRED EMBODIMENT

Figure 1A:
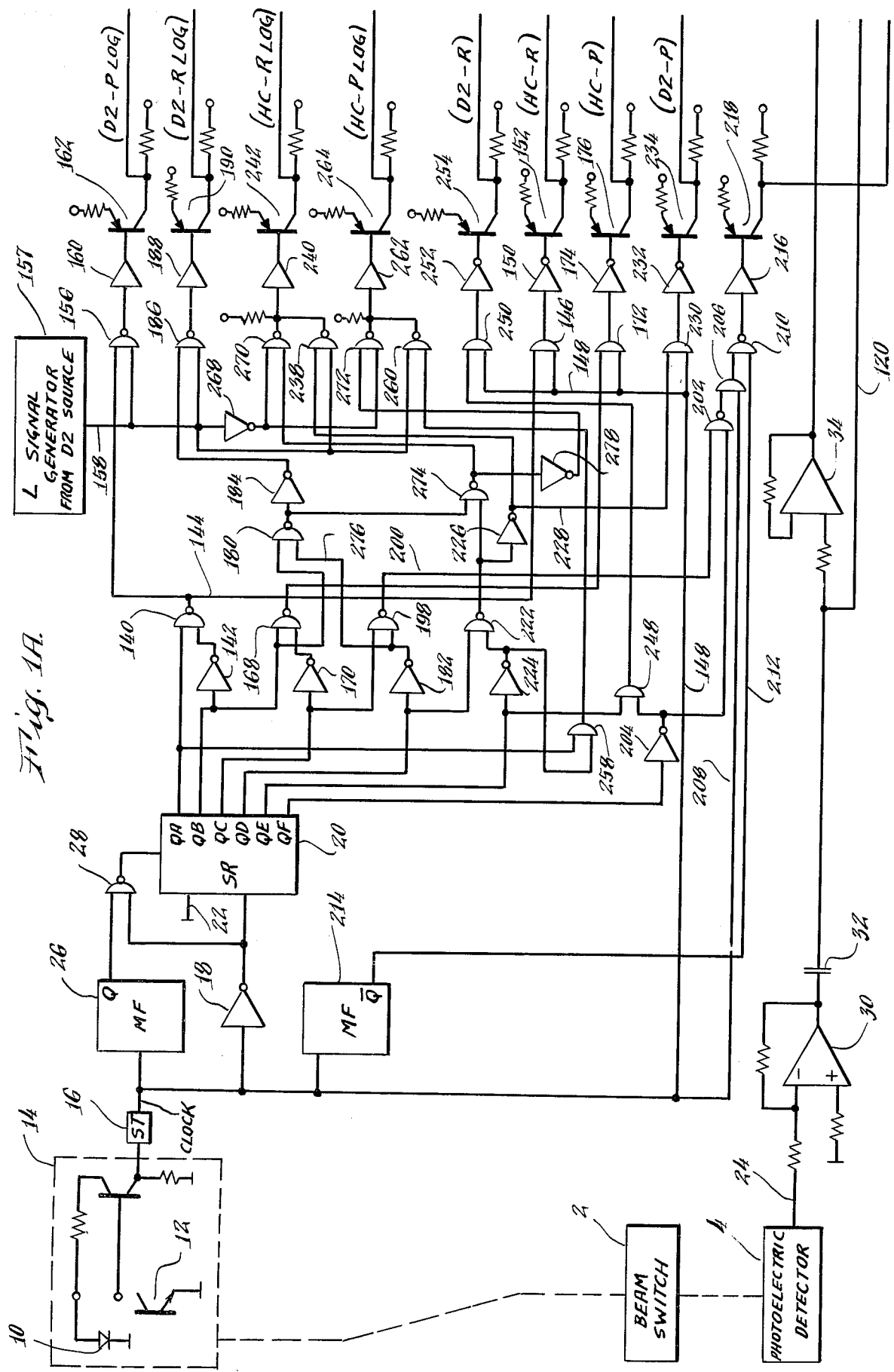
FIG. 1 a and b is a combined schematic and block diagram for the signal gating apparatus of this invention.
Figure 1B:
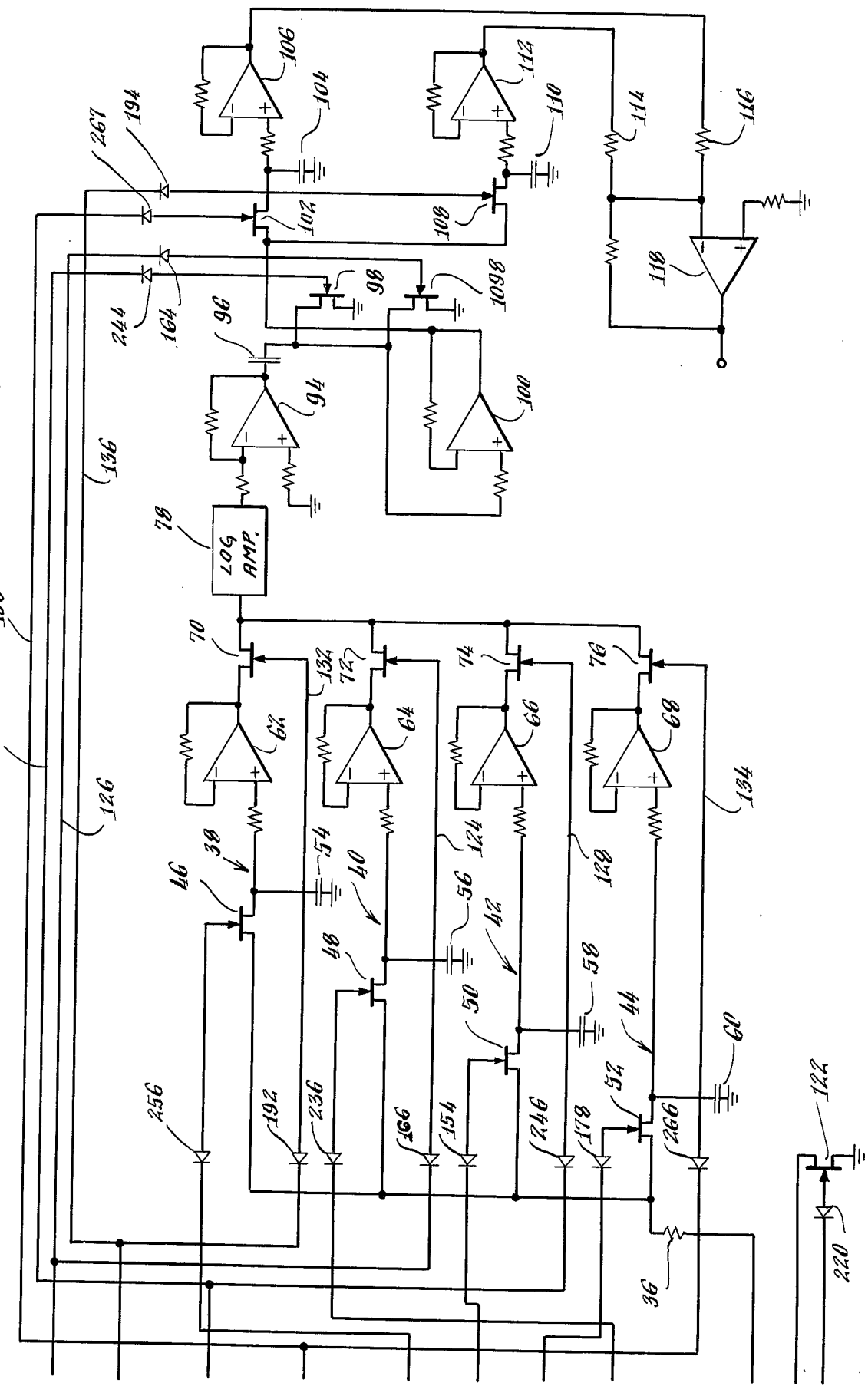

Turning now to the drawings, and more particularly to FIG. 1, there is illustrated a combined schematic and block diagram for the signal gating apparatus of this invention. As is common in the art of spectrophotometers, light is directed to a photoelectric detector 4 by a beam switch 2 which has been modified by the invention to operate as part of a photoelectric means for generating a marker pulse within a sequence of clock pulses that correspond to the positions of the beam switch 2. Otherwise, a gating means for directing output signals from the detector 4 to separate storage channels is synchronized with the photoelectric means for generating clock pulses through a counter means for generating output signals in sequence with input pulses thereto.

Of course, the extent of modification to the beam switch 2 depends on the particular type of beam switch that is utilized. As an example, the beam switch disclosed in pending application Ser. No. 435,338 filed Jan. 21, 1974, now U.S. Pat. No. 3,901,601, would be modified to have radially projecting apertures on its mask at corresponding locations to the positions of the beam switch 2 which are synchronized. Otherwise the photoelectric means for generating clock pulses includes a luminescence diode 10 and a photoelectric transistor 12 which are disposed within a preamplifier 14 which develops an output pulse from light passing through each radially projecting aperture of the beam switch 2. A Schmidt trigger 16 is driven from the output of the preamplifier 14 to generate the clock pulses illustrated in FIG. 2. The clock pulses are directed through a signal inverter 18 to the count input of a shift register 20 which is utilized as the counter means. To the serial input 22 of the shift register 20 a DC level (hereinafter designated as L) is applied so that the outputs $Q_A - Q_F$ thereof are set to L in sequence with the clock pulses. The clock pulses are also directed to the input of a monostable flip-flop 26 from which the constant duration output, designated as MF1Q in FIG. 2, is directed to one input of a logic gate 28, while the signal from the inverter 18 is directed to the other input of gate 28. One of the radially projecting apertures on the mask of the beam switch 2 is substantially narrower than the others and the distinctively short clock pulse resulting therefrom is detected as the marker clock pulse at the output of gate 28 which is directed to the reset of the shift register 20. To accomplish this, the constant duration output of the monostable flip-flop 26 is made shorter than the duration of the long clock pulses but longer than the duration of the short marker clock pulse. Therefore, the shift register 20 is reset only toward the end of the short marker clock pulse because only then do the outputs of the inverter 18 and the monostable flip-flop 26 become L simultaneously, as is illustrated by the pulse designated RESET SR in FIG. 2. Although a NAND element is utilized for the gate 28, one skilled in the art will certainly understand without further explanation that an AND element could have been utilized with only very minor changes to the previously described interconnections.

For the embodiment of the invention which is illustrated in FIG. 1, the detector 4 and beam switch 2 are assumed to be disposed as elements in a spectrophotometer wherein radiation is directed to the former from the latter in the following sequence:
1. light from a hollow cathode lamp along a reference path, for which clock pulse HC-R is developed;
2. light from the hollow cathode lamp along a sample path, for which clock pulse HC-P is developed;
3. no light, for which clock pulse DARK I is developed;
4. light from a deuterium lamp along the sample path, for which clock pulse D2-P is developed;
5. light from the deuterium lamp along the reference path, for which clock pulse D2-R is developed; and
6. no light, for which clock pulse DARK II is developed.

Therefore, the clock pulse following the marker pulse is HC-R which sets the output $Q_A$ of the shift register 20 to L while all other outputs thereof ($Q_B - Q_F$) remain 0. The clock pulse following HC-R is HC-P which sets both inputs $Q_A$ and $Q_B$ of the shift register 20 to L. Thereafter, the other outputs $Q_C - Q_F$ of the shift register 20 are sequentially set to L by the DARK I, D2-P, D2-R and DARK II clock pulses, respectively, as is illustrated in FIG. 2.

Signals from the detector 4 pass in series through input line 24, an amplifier 30, a capacitor 32, an amplifier 34 having a high impedance input and a resistor 36, to four storage channels 38, 40, 42 and 44, respectively. The connection between the capacitor 32 and the amplifier 34 is connected to ground through line 120 and a switch 122, such as a field effect transistor.

Each storage channel 38 – 44 includes an input switch 46, 48, 50 and 52, respectively, such as a field effect transistor. Each input switch 46 – 52 is connected to the input of an amplifier 62, 64, 66 and 68, respectively, with the connection therebetween being connected to ground through a capacitor 54, 56, 58 and 60, respectively. The output of each amplifier 62 – 68 is connected to an output switch 70, 72, 74 and 76, respectively, such as a field effect transistor. The input switches 46 – 52 and the output switches 70 – 76 in each storage channel 38 – 44 are sequentially controlled by the $Q_A - Q_F$ outputs of the shift register 20 through the signal gating means which will be described later in this disclosure. As an example of this control, input switch 46 is conductive for the duration of the D2-R clock pulse. Therefore, while the light from the deuterium lamp is directed to the detector 4 along the reference path, the output signal from the detector 4 is stored in channel 38, as illustrated in FIG. 2. Otherwise, input switches 48 – 52 are each conductive for the duration of the D2-P, HC-R and HC-P clock pulses, respectively. Therefore, a signal is stored in channel 40 when the light from the deuterium lamp is directed to the detector 4 along the sample path, a signal is stored in channel 42 when the light from the hollow cathode lamp is directed to the detector 4 along the reference path, and a signal is stored in channel 44 when the light from the hollow cathode lamp is directed to the detector 4 along the sample path. Since time is required to charge the capacitors 54 – 60 in each storage channel 38 – 44, the control sequence of the output switches 70 – 76 is different from that of the input switches 46 – 52. For example, output switch 70 in storage channel 38 becomes conductive on the HC-P clock pulse and remains so until the D2-P clock pulse, as is illustrated in FIG. 2. Therefore, output switch 70 of storage channel 38 is blocked when input switch 46 is conductive. Otherwise, output switch 72 becomes conductive on the HC-R clock pulse and remains so until the HC-P clock pulse, while output switch 74 becomes conductive on the D2-P clock pulse and remains so until the D2-R clock pulse and output switch 76 becomes conductive on the D2-R clock pulse and remains so until the HC-R clock pulse, as is further illustrated in FIG. 2.

Although the inputs to and the outputs from the storage channels 38 – 44 could be controlled in any sequence within the scope of this invention, the embodiment of FIG. 1 relates specifically to a spectrophotometer, as was mentioned previously. Therefore, the output switches 70 – 76 are all commonly connected to the input of a logarithmic amplifier 78 which provides an output voltage which is proportional to the logarithm of the input voltage. Light from the dual sources of the hollow cathode lamp and the deuterium lamp is provided in the spectrophotometer for correction of the background absorption and therefore, the output of the logarithmic amplifier 78 passes in series through an amplifier 94, a coupling capacitor 96 and a second amplifier 100 to a pair of parallel output channels which connect to the inputs of a summing amplifier 118. In each channel an output switch 102 and 108, respectively, an amplifier 106 and 112, respectively, and a summing resistor 116 and 114, respectively, are connected in series with the respective connections between the switches 102, 108 and the amplifiers 106, 112 being grounded through a capacitor 104 and 110, respectively. The connection between the coupling capacitor 96 and the amplifier 100 is connected to ground through two separate switches 98 and 1098, respectively. Of course, output switches 102, 108 and the grounding switches 98, 1098 can be of any suitable type, such as field effect transistors.

The gating means for directing signals from the detector 2 into and out of each separate storage channel 38 – 44 in sequence with the output signals of the counter means is accomplished by connecting the outputs ($Q_A - Q_F$) of the shift register 20 to control the previously mentioned switches through a combination of logic gates. The output $Q_A$ is connected to one input of an AND gate 140, while the second input of gate 140 is connected to the output $Q_B$ through a signal inverter 142. The output of AND gate 140 is connected to one input of an AND gate 146 through line 144, while the second input of gate 146 is connected to the clock pulse output of the Schmidt trigger 16 through line 148. The output of AND gate 146 controls the input switch 50 in storage channel 42 through a signal inverter 150, a level adjusting amplifier 152 and a diode 154. The output of AND gate 140 is also connected to one input of a NAND gate 156, while the second input of gate 156 is connected to a signal generator 157 through line 158. A DC level (hereinafter also designated as L) is generated by the signal generator 157 whenever the deuterium lamp is energized to emit radiation. The output of NAND gate 156 is connected through an amplifier 160 and a level adjusting amplifier 162 to control both the output switch 72 in storage channel 40 and the grounding switch 1098 to coupling capacitor 96, through line 124 having a diode 166 therein and through line 126 having a diode 164 therein, respectively. Of course, during the HC-R clock pulse which occurs sequentially after the marker clock pulse has reset the shift register 20, the $Q_A$ output is set to L while the $Q_B - Q_F$ outputs remain 0, so that the outputs of AND gates 140 and 146 are L while the output of NAND gate 156 is 0. Therefore, input switch 50 in storage channel 42, output switch 72 in storage channel 40 and grounding switch 1098 to coupling capacitor 96 all become conductive when the HC-R clock pulse occurs.

The output $Q_B$ is also connected to one input of an AND gate 168, while the second input of gate 168 is connected to output $Q_C$ through a signal inverter 170. The output of AND gate 168 is connected to one input of an AND gate 172, while the second input of gate 172 is connected to the clock pulse output of the Schmidt trigger 16 through line 148. The output of AND gate 172 controls the input switch 52 in storage channel 44 through a signal inverter 174, a level adjusting amplifier 176 and a diode 178. Output $Q_B$ is further connected to one input of a NAND gate 180, while the second input of gate 180 is connected to the output $Q_D$ through a signal inverter 182. The output of NAND gate 180 is connected to one input of a NAND gate 186 through a signal inverter 184 while the second input of gate 186 is connected to the signal generator 157 through line 158. The output of NAND gate 186 is connected through an amplifier 188 and a level adjusting amplifier 190 to control both the output switch 70 in storage channel 38 and the logarithmic amplifier output channel switch 108, through line 132 having a diode 192 therein and through line 136 having a diode 194 therein, respectively. Of course, during the HC-P clock pulse which occurs sequentially after the HC-R clock pulse, the $Q_A$ and $Q_B$ outputs are set to L while the $Q_C - Q_F$ outputs remain 0, so that the outputs of AND gates 168 and 172 are L while the outputs of NAND gates 180 and 186 are 0. Furthermore, the outputs of AND gates 140 and 146 are 0, while the output of NAND gate 156 is L because of inverter 142. Therefore, the input switch 52 in storage channel 44, the output switch 70 in storage channel 38 and the logarithmic amplifier output channel switch 108 all become conductive, while the input switch 50 in storage channel 42, the output switch 72 in storage channel 40 and the grounding switch 1098 to coupling capacitor 96 all become blocked, when the HC-P clock pulse occurs.

The output of $Q_C$ is also connected to one input of a NAND gate 198, while the second input of gate 198 is connected to the output $Q_D$ through a signal inverter 182. The output of NAND gate 198 is connected to one input of a NAND gate 202 through line 200, while the second input of gate 202 is connected to the output $Q_F$ through a signal inverter 204. The output of NAND gate 202 is connected to one input of an AND gate 206, while the second input of gate 206 is connected to the clock pulse output of the Schmidt trigger 16 through line 208. The output of AND gate 206 is connected to one input of a NAND gate 210 while the second input of gate 210 is connected through line 212 to the inverse output $\overline{Q}$ of a second monostable flip-flop 214 which has its input connected to the clock pulse output of the Schmidt trigger 16. The output of NAND gate 210 controls the grounding switch 122 to coupling capacitor 32 through an amplifier 216, a level adjusting amplifier 218 and a diode 220. Of course, during the DARK I clock pulse which occurs sequentially after the HC-P clock pulse, the $Q_A - Q_C$ outputs are set to L while the $Q_D - Q_F$ outputs remain 0, so that the outputs of NAND gates 198 and 210 are 0 with the latter output being delayed by the duration of the Q output from the flip-flop 214, while the output of NAND gate 202 and AND gate 206 are L. Furthermore, the outputs of AND gates 168 and 172 are 0 because of inverter 170. Therefore, the grounding switch 122 to coupling capacitor 32 becomes conductive while the switch 52 in storage channel 44 becomes blocked, when the DARK I clock pulse occurs.

The output of $Q_D$ is also connected to one input of a NAND gate 222, while the second input of gate 222 is connected to the output of $Q_E$ through a signal inverter 224. The output of NAND gate 222 is connected to one input of an AND gate 230 through a signal inverter 226, while the second input of gate 230 is connected to the clock pulse output of the Schmidt trigger 16 through line 148. The output of AND gate 230 controls the input switch 48 in storage channel 40 through a signal inverter 232, a level adjusting amplifier 234 and a diode 236. The output of inverter 226 is also connected to one input of a NAND gate 238, while the second input of gate 238 is connected to the signal generator 157 through line 158. The output of NAND gate 238 is connected through an amplifier 240 and a level adjusting amplifier 242 to control both the output switch 74 in storage channel 42 and the grounding switch 98 to coupling capacitor 96, through line 128 having a diode 246 therein and through line 130 having a diode 244 therein, respectively. Of course, during the D2-P clock pulse which occurs sequentially after the DARK I clock pulse, the $Q_A - Q_D$ outputs are set to L while the $Q_E$ and $Q_F$ outputs remain 0, so that the outputs of NAND gates 222 and 238 are 0 while the output of AND gate 230 is L. Furthermore, the outputs of NAND gates 180, 186, 198 and 210 are L while the output of NAND gate 202 and AND gate 206 are 0 because of inverter 182. Therefore, the input switch 48 in storage channel 40, the output switch 74 in storage channel 42 and the grounding switch 98 to coupling capacitor 96 all become conductive while the grounding switch 122 to coupling capacitor 32, the output switch 70 in storage channel 38 and the logarithmic amplifier output channel switch 108 all become blocked, when the D2-P clock pulse occurs.

The output $Q_E$ is also connected to one input of an AND gate 248, while the second input of gate 248 is connected to output $Q_F$ through a signal inverter 204. The output of AND gate 248 is connected to one input of an AND gate 250, while the second input of gate 250 is connected to the clock pulse output of the Schmidt trigger 16 through line 148. The output of AND gate 250 controls the input switch 46 in storage channel 38 through a signal inverter 252, a level adjusting amplifier 254 and a diode 256. One input of a NAND gate 258 is also connected to output $Q_E$ through the previously mentioned inverter 224, while the second input of gate 258 is connected to output $Q_A$. The output of NAND gate 258 is connected to one input of a NAND gate 260, while the second input of gate 260 is connected to the signal generator 157 through line 158. The output of NAND gate 260 is connected through an amplifier 262 and a level adjusting amplifier 264 to control both the output switch 76 in channel 44 and the logarithmic amplifier output channel switch 102, through line 134 having a diode 266 therein and through line 138 having a diode 267 therein, respectively. Of course, during the D2-R clock pulse which occurs sequentially after the D2-P clock pulse, the $Q_A - Q_E$ outputs are set to L while the $Q_F$ output remains 0, so that the outputs of AND gates 248 and 250 and NAND gate 258 are L while the output of NAND gate 260 is 0. Furthermore, the outputs of NAND gates 222 and 238 are L while AND gate 230 is 0 because of inverter 224. Therefore, the input switch 46 in storage channel 38, the output switch 76 in channel 44 and the logarithmic amplifier output channel switch 102 all become conductive while the input switch 48 in storage channel 40, the output switch 74 in storage channel 42 and the grounding switch 98 to coupling capacitor 96 all become blocked, when the D2-R clock pulse occurs.

As previously mentioned, the output of $Q_F$ is connected through inverter 204 to the second input of NAND gate 202 which controls the grounding switch 122 to coupling capacitor 32 through AND gate 206, NAND gate 210, amplifier 216, level adjusting amplifier 218 and diode 220. Of course, during the DARK II clock pulse which occurs sequentially after the D2-R clock pulse, the outputs $Q_A - Q_F$ are all set to L, so that the outputs of NAND gate 202 and AND gate 206 are L while the output of NAND gate 210 is 0 after a delay equal to the duration of the Q output from the flip-flop 214. Furthermore, the outputs of AND gates 248 and 250 are 0 because of inverter 204. Therefore, the grounding switch 122 to coupling capacitor 32 again becomes conductive while the input switch 46 in storage channel 38 becomes blocked when the DARK II clock pulse occurs. Sequentially after the DARK II clock pulse, the marker clock pulse again occurs to reset the outputs $Q_A - Q_F$ of the shift register 20, to 0 and the previously described sequencing of the switches is repeated.

To control the output switch 74 in storage channel 42, the output switch 76 in storage channel 44, the grounding switch 98 to coupling capacitor 96 and the logarithmic amplifier output channel switch 102 in a different sequence when the deuterium lamp is not energized, the signal generator 157 is also connected through the gating means to the $Q_B$, $Q_D$, and $Q_E$ outputs of the counter means. One input of a NAND gate 270 is connected to the signal generator 157 through a signal inverter 268, while the second input of gate 270 is connected to the output of a NAND gate 274. One input to NAND gate 274 is connected to the output of NAND gate 222, while the second input of gate 274 is connected to the output of NAND gate 180 through line 276. The output of NAND gate 270 is connected in the same manner as was mentioned previously regarding the output of NAND gate 238, to control the output switch 74 in storage channel 42 and the grounding switch 98 to coupling capacitor 96. The output of NAND gate 274 is also connected to one input of a NAND gate 272 through a signal inverter 278, while the second input of gate 272 is connected to the signal generator 157 through inverter 268. The output of NAND gate 272 is connected in the same manner as was mentioned previously regarding the output of NAND gate 260, to control the output switch 76 in storage channel 44 and the logarithmic amplifier output channel switch 102. Of course, the output switch 74 in storage channel 42 and the grounding switch 98 to coupling capacitor 96 can only become conductive from the output of NAND gate 270 when that output is 0, while the output switch 76 in storage channel 44 and the logarithmic amplifier output channel switch 102 can only become conductive from the output of NAND gate 272 when that output is 0. For the output of either NAND gate 270 or 272 to be 0, the output of signal generator 157 must be 0, which only occurs when the deuterium lamp is not energized. Furthermore, the output of NAND gate 270 can only be 0 when the output of NAND gate 274 is L, which occurs through NAND gates 180 and 222 starting when output $Q_B$ of the counter means is set to L and terminating when output $Q_E$ is set to L, while the output of NAND gate 272 can only be 0, when the output of NAND gate 274 is 0, which occurs through NAND gates 180 and 222 starting when output $Q_E$ of the counter means is set to L and terminating when output $Q_B$ is set to L. Therefore, when the deuterium lamp is not energized, the output switch 74 in storage channel 42 and the grounding switch 98 to the coupling capacitor 96 become conductive on the HC-P clock pulse and become blocked on the D2-R clock pulse, while the output switch 76 in storage channel 44 and the logarithmic amplifier output channel switch 102 become conductive starting on the D2-R clock pulse and become blocked on the HC-P clock pulse.

The spectrophotometer to which this invention is applied in the embodiment of FIG. 1 operates to produce a signal at the output of the summing amplifier 118 which has a voltage level proportional to $$-\log \frac{I_{HC\text{-}P} \times I_{D2\text{-}R}}{I_{HC\text{-}R} \times I_{D2\text{-}P}}$$

wherein, $I_{HC\text{-}P}$ is equal to the intensity of light from the hollow cathode lamp along the sample path;

$I_{HC\text{-}R}$ is equal to the intensity of light from the hollow cathode lamp along the reference path;

$I_{D2\text{-}P}$ is equal to the intensity of light from the deuterium lamp along the sample path; and $I_{D2\text{-}R}$ is equal to the intensity of light from the deuterium lamp along the reference path.

This is accomplished with signals from the storage channels 38 – 44 through an analyzing means which generally includes the output switches 70 – 76, the logarithmic amplifier 78, the coupling capacitor 96, the grounding switches 98 and 1098, the output channel switches 102 and 108, and the summing amplifier 118. Starting with the D2-P clock pulse, the output switch 74 and the grounding switch 98 become conductive to charge the coupling capacitor 96 with a voltage proportional to the logarithm of the signal in storage channel 42 which is the detector output for the light of the hollow cathode lamp along the reference path. Then throughout the D2-R and DARK II clock pulses, the output switch 74 and the grounding switch 98 become blocked, while the output switch 76 and the output channel switch 102 become conductive. Therefore, a voltage proportional to the logarithm of the signal in storage channel 44 which is the detector output for the light of the hollow cathode lamp along the sample path, is impressed on coupling capacitor 96 in opposition to the voltage previously charged thereon during the D2-P clock pulse. Consequently, a signal is directed to one input of the summing amplifier 118 through the output channel switch 102 that is proportional to $$-\log \frac{I_{HC\text{-}P}}{I_{HC\text{-}R}}.$$

During the HC-R clock pulse, the output switch 76 and the output channel switch 102 are blocked while the output switch 72 and the grounding switch 1098 become conductive to charge the coupling capacitor 96 with a voltage proportional to the logarithm of the signal in storage channel 40 which is the detector output for the light of the deuterium lamp along the sample path. Then throughout the HC-P and DARK I clock pulses, the output switch 72 and the grounding switch 1098 become blocked while the output switch 70 and the output channel switch 108 become conductive. Therefore, a voltage proportional to the logarithm of the signal in storage channel 38 which is the detector output for the light of the deuterium lamp along the reference path is impressed on coupling capacitor 96 in opposition to the voltage previously charged thereon during the HC-R clock pulse. Consequently, a signal is directed to the other input of the summing amplifier 118 through the output channel switch 108 that is proportional to $$-\log \frac{I_{D2\text{-}R}}{I_{D2\text{-}P}}.$$

The grounding switch 122 is only conductive during the DARK I and DARK II clock pulses. As mentioned previously, no light passes to the detector 4 from either the hollow cathode lamp or the deuterium lamp during these clock pulses and consequently, the output signals from the detector 2 can only be attributed to the intensity of the flame in the atomic absorption spectrophotometer. Therefore, a voltage proportional to the intensity of the flame is charged on the coupling capacitor 32 during the DARK I and DARK II clock pulses. After the DARK I clock pulse, voltages proportional to the intensity of the deuterium lamp through the sample and reference paths are impressed on coupling capacitor 32 during D2-P and D2-R clock pulses, respectively and after the DARK II clock pulse, voltages proportional to the intensity of the hollow cathode lamp through the sample and reference paths are impressed on coupling capacitor 32 during the HC-R and HC-P clock pulses, respectively. Since the voltages impressed on coupling capacitor 32 during D2-P, D2-R and the HC-R, HC-P clock pulses, respectively are in opposition to the voltages previously charged on the coupling capacitor 32 during the DARK I and DARK II clock pulses, respectively, the signals directed to the storage channels 38 – 44 during the D2-R, D2-P, HC-R and HC-P clock pulses, respectively, are corrected in regard to the intensity of the flame.

What we claim is:

1. Apparatus for directing signals from a photoelectric detector to separate storage channels in sequence with the positions of a beam switch which sequentially directs light from different beams to the photoelectric detector, comprising:
   counter means for generating output signals in sequence with input pulses thereto;
   a logic gate having the output thereof connected to reset the counter means;
   gating means for directing signals from the photoelectric detector to each storage channel in sequence with the output signals of the counter means; and
   photoelectric means for generating a marker pulse within a sequence of clock pulses which correspond to the positions of the beam switch, the pulses being connected to the input of the counter means and to one input of the logic gate, with a second input of the logic gate being connected to the pulses through a monostable flip-flop.

2. The apparatus of claim 1 wherein the marker pulse is shorter than the clock pulses and the duration of the output signal from the monostable flip-flop is shorter than the clock pulses but longer than the marker pulse, the first input to the logic gate being connected to the pulses through a signal inverter.

3. The apparatus of claim 1 wherein an input switch, an amplifier having high input impedance and an output switch are series connected in each storage channel with the interconnection between the input switch and the amplifier being connected to ground through a capacitor, the input and output switches in each storage channel being controlled from the output signals of the counter means through the gating means.

4. The apparatus of claim 3 wherein the outputs from all the storage channels are commonly connected and a logarithmic amplifier is connected to the common output.

5. The apparatus of claim 4 wherein the output of the logarithmic amplifier is connected through at least one capacitor to at least one grounding switch and to at least one output channel switch, the output channel and grounding switches being controlled from the output signals of the counter means through the gating means.

6. The apparatus of claim 4 wherein the output of the logarithmic amplifier is connected through at least one capacitor to a pair of grounding switches and to a pair of output channel switches, the output channel and grounding switches being controlled from the output signals of the counter means through the gating means.

7. The apparatus of claim 6 wherein each output channel switch is connected to the input of an output channel amplifier.

8. The apparatus of claim 7 wherein four storage channels are provided and the beam switch includes four positions at which a first beam is directed through a reference path, the first beam is directed through a sample path, a second beam is directed through a sample path, and the second beam is directed through a reference path, respectively.

9. The apparatus of claim 8 wherein the input of each output channel amplifier is grounded through a capacitor and the outputs of both output channel amplifiers are connected to the input of a summing amplifier, one of the grounding switches being controlled simultaneously with one storage channel output switch to charge the logarithmic output capacitor and sequentially thereafter one output channel switch being controlled simultaneously with the second storage channel output switch to thereby direct into the summing amplifier through one output channel a signal of logarithmic proportionality to the sample path signal minus the reference path signal for the first beam, and the other grounding switch being controlled simultaneously with the third storage channel output switch to charge the logarithmic output capacitor and sequentially thereafter the other output channel switch being controlled simultaneously with the fourth storage channel output switch to thereby direct into the summing amplifier through the other output channel a signal of logarithmic proportionality to the reference path signal minus the sample path signal for the second beam.

10. The apparatus of claim 9 wherein the beam switch further includes masked positions at which no light is directed from either beam, one masked position being located between the beam switch positions at which the first and second beams are directed to their sample paths and another masked position being located between the beam switch positions at which the first and second beams are directed to their reference paths; and wherein the inputs to all the storage channels are commonly connected and the output signal from the photoelectric detector is connected to the common storage channel input through a capacitor, the common storage channel input being grounded through a switch, the common input grounding switch being controlled from the output signals of the counter means through the gating means.

11. The apparatus of claim 10 wherein the gating means further includes logic gates to block all storage channel input switches and to render at least one storage channel output switch conductive at the masked positions of the beam switch.

12. The apparatus of claim 11 wherein the counter means includes a shift register, wherein the photoelectric pulse generating means includes a Schmidt trigger, and wherein each storage channel input switch is controlled through an AND gate, the output of the Schmidt trigger being connected to the count input of the shift register and to one input of each AND gate, the other inputs of each AND gate being connected to one output signal of the shift register.

* * * * *

UNITED STATES PATENT OFFICE
CERTIFICATE OF CORRECTION

Patent No. 3,967,900          Dated July 6, 1976

Inventor(s) Willi Henninger et al

It is certified that error appears in the above-identified patent and that said Letters Patent are hereby corrected as shown below:

The schematic and block diagram shown on the cover page should be turned through 180 degrees.

Column 6, line 33 "becuase" should read --because--.

Column 8 between lines 22 and 27, the illegible equation should read--

$$-\log \frac{I_{HC-P} \times I_{D2-R}}{I_{HC-R} \times I_{D2-P}} \quad --.$$

Column 8 between lines 63 and 67, the illegible equation should read--

$$-\log \frac{I_{HC-P}}{I_{HC-R}} \quad --.$$

Column 9 between lines 19 and 23, the illegible equation should read--

$$-\log \frac{I_{D2-R}}{I_{D2-P}} \quad --.$$

Signed and Sealed this

Twelfth Day of October 1976

[SEAL]

*Attest:*

RUTH C. MASON
*Attesting Officer*

C. MARSHALL DANN
*Commissioner of Patents and Trademarks*